United States Patent
Bhatia et al.

(10) Patent No.: US 10,397,313 B2
(45) Date of Patent: Aug. 27, 2019

(54) DATA STREAM LOAD BALANCING UTILIZING MULTIPLE SETS OF SERVERS

(71) Applicant: Alcatel-Lucent USA Inc., Murray Hill, NJ (US)

(72) Inventors: Randeep S. Bhatia, Green Brook, NJ (US); Murali Kodialam, Marlboro, NJ (US); T. V. Lakshman, Morganville, NJ (US)

(73) Assignee: Nokia of America Corporation, Murray Hill, NJ (US)

( * ) Notice: Subject to any disclaimer, the term of this patent is extended or adjusted under 35 U.S.C. 154(b) by 623 days.

(21) Appl. No.: 14/661,365

(22) Filed: Mar. 18, 2015

(65) Prior Publication Data

US 2016/0277542 A1 Sep. 22, 2016

(51) Int. Cl.
*H04L 29/06* (2006.01)
*H04L 29/08* (2006.01)
*H04L 12/803* (2013.01)

(52) U.S. Cl.
CPC ...... *H04L 67/1008* (2013.01); *H04L 67/1002* (2013.01); *H04L 67/1014* (2013.01); *H04L 67/1023* (2013.01); *H04L 67/1029* (2013.01); *H04L 67/1031* (2013.01);
(Continued)

(58) Field of Classification Search
CPC ............. H04L 67/1023; H04L 67/1029; H04L 67/1025; H04L 67/1027; H04L 67/1006; H04L 47/125; H04L 45/7453; H04L 67/1002; H04L 67/1008; H04L 67/1014
See application file for complete search history.

(56) References Cited

U.S. PATENT DOCUMENTS 8,086,714 B2 * 12/2011 Nishikawa ............ G06F 9/505
 709/223
8,260,803 B2 9/2012 Hsu et al.
(Continued)

FOREIGN PATENT DOCUMENTS

WO 2014062183 A1 4/2014

OTHER PUBLICATIONS

Vijayshankar Raman et al, "Partial Results for Online Query Processing", Jun. 6, 2002, ACM 1-58113-497—May 2, 2006, pp. 1-6. (Year: 2002).*
(Continued)

*Primary Examiner* — Gregory G Todd
(74) *Attorney, Agent, or Firm* — Ryan, Mason & Lewis, LLP

(57) ABSTRACT

In a data processing system, a received data stream comprises a plurality of tuples having respective key values. The received data stream is separated into portions that are delivered to respective ones of a first set of servers in a manner that permits different tuples having the same key value to be processed by different servers of the first set. For each distinct key value, each of at least a subset of the servers of the first set maintains a corresponding partial key result based on one or more of the tuples having that key value that are received by that server. The partial key results are periodically delivered from the servers of the first set to servers of a second set of servers in a manner that ensures that different partial key results having the same key value are processed by the same server of the second set.

24 Claims, 7 Drawing Sheets

(52) U.S. Cl.
CPC ............ *H04L 47/125* (2013.01); *H04L 67/32* (2013.01); *H04L 69/14* (2013.01)

(56) References Cited

U.S. PATENT DOCUMENTS

| | | | | |
|---|---|---|---|---|
| 8,260,826 | B2* | 9/2012 | Chen | G06F 17/30516 707/803 |
| 9,313,604 | B1* | 4/2016 | Holcombe | H04W 4/001 |
| 9,571,570 | B1* | 2/2017 | Mutnuru | H04L 67/1023 |
| 10,042,564 | B2* | 8/2018 | Motwani | G06F 3/067 |
| 2005/0114862 | A1* | 5/2005 | Bisdikian | G06F 9/5072 718/105 |
| 2009/0003216 | A1* | 1/2009 | Radunovic | H04L 45/123 370/237 |
| 2011/0276789 | A1* | 11/2011 | Chambers | G06F 9/3885 712/220 |
| 2013/0297798 | A1* | 11/2013 | Arisoylu | H04L 67/1027 709/226 |
| 2013/0332608 | A1 | 12/2013 | Shiga et al. | |
| 2014/0095503 | A1 | 4/2014 | Branson et al. | |
| 2014/0379938 | A1* | 12/2014 | Bosch | H04L 47/125 709/242 |
| 2015/0215819 | A1* | 7/2015 | Bosch | H04W 24/02 370/221 |
| 2017/0134424 | A1* | 5/2017 | Egorov | H04L 63/166 |
| 2017/0149878 | A1* | 5/2017 | Mutnuru | H04L 67/1029 |

OTHER PUBLICATIONS

C. Liu et al., "Automating Distributed Partial Aggregation," Proceedings of the ACM Symposium on Cloud Computing (SOCC), Nov. 2014, 12 pages.
J.-H. Hwang et al., "High-Availability Algorithms for Distributed Stream Processing," Proceedings of the 21st International Conference on Data Engineering (ICDE), Apr. 2005, pp. 779-790, Tokyo, Japan.
M. Cherniack et al., "Scalable Distributed Stream Processing," Proceedings of the Conference on Innovative Data Systems Research (CIDR), Jan. 2003, pp. 257-268, vol. 3.
"Storm," http://storm.apache.org/, 2014, 2 pages.
"Storm Concepts," http://storm.apache.org/documentation/Concepts.html, 2014, 4 pages.
S. Acharya et al., "Broadcast Disks: Data Management for Asymmetric Communication Environments," Proceedings of the ACM SIGMOD Conference on Management of Data, May 1995, pp. 199-210, vol. 24, No. 2.
T. Akidau et al., "MillWheel: Fault-Tolerant Stream Processing at Internet Scale," Proceedings of the Very Large Data Bases (VLDB) Endowment, Aug. 2013, pp. 1033-1044, vol. 6, No. 11, Riva del Garda, Trento, Italy.
M.H. Ammar et al., "The Design of Teletext Broadcast Cycles," Performance Evaluation, Nov. 1985, pp. 235-242, vol. 5.
M.H. Ammar et al., "On the Optimality of Cyclic Transmission in Teletext Systems," IEEE Transactions on Communications, Jan. 1987, pp. 68-73, vol. COM-35, No. 1.
A. Bar-Noy et al., "Minimizing Service and Operation Costs of Periodic Scheduling," Mathematics of Operations Research, Aug. 2002, pp. 518-544, vol. 27, No. 3.
P. Bhatotia et al., "Incoop: MapReduce for Incremental Computations," Proceedings of the 2nd ACM Symposium on Cloud Computing (SOCC), Article No. 7, Oct. 2011, 14 pages, Cascais, Portugal.
J. Chang et al., "Broadcast Scheduling: Algorithms and Complexity," ACM Transactions on Algorithms (TALG), Article No. 47, Sep. 2011, 10 pages, vol. 7, No. 4.
C. Chekuri et al., "Online Scheduling to Minimize Maximum Response Time and Maximum Delay Factor," Theory of Computing, May 2012, pp. 165-195, vol. 8, No. 1.
T. Condie et al., "MapReduce Online," Proceedings of the 7th USENIX Conference on Networked Systems Design and Implementation (NSDI), Apr. 2010, 15 pages.
H. Kaplan et al., "Faster Kinetic Heaps and Their Use in Broadcast Scheduling (Extended Abstract)," Proceedings of the 12th Annual ACM-SIAM Symposium on Discrete Algorithms (SODA), Jan. 2001, pp. 836-844.
M. Kudlur et al., "Orchestrating the Execution of Stream Programs on Multicore Platforms," Proceedings of the ACM SIGPLAN Conference on Programming Language Design and Implementation (PLDI), Jun. 2008, pp. 114-124, vol. 43, No. 6.
L. Neumeyer et al., "S4: Distributed Stream Computing Platform," Proceedings of the IEEE International Conference on Data Mining Workshops (ICDMW), Dec. 2010, pp. 170-177, Sydney, New South Wales, Australia.
C.-J. Su et al., "Broadcast Scheduling for Information Distribution," Proceedings of the 16th Annual Joint Conference of the IEEE Computer and Communications Societies, Driving the Information Revolution (INFOCOM), Apr. 1997, pp. 109-117, vol. 1, Kōbe-shi, Japan.
N. Tatbul et al., "Staying FIT: Efficient Load Shedding Techniques for Distributed Stream Processing," Proceedings of the 33rd International Conference on Very Large Data Bases (VLDB), Sep. 2007, pp. 159-170, Vienna, Austria.
Y. Xing et al., "Dynamic Load Distribution in the Borealis Stream Processor," Proceedings of the 21st International Conference on Data Engineering (ICDE), Apr. 2005, pp. 791-802.
M. Zaharia et al., "Resilient Distributed Datasets: A Fault-Tolerant Abstraction for In-Memory Cluster Computing," Proceedings of the 9th USENIX Symposium on Networked Systems Design and Implementation (NSDI), 2012, 14 pages.
M. Zaharia et al., "Discretized Streams: An Efficient and Fault-Tolerant Model for Stream Processing on Large Clusters," Proceedings of the 4th USENIX Conference on Hot Topics in Cloud Computing (HotCloud), 2012, 6 pages.
George Kingsley Zipf, "Human Behavior and the Principle of Least Effort," American Anthropologist, Apr.-Jun. 1950, pp. 268-270, vol. 52, No. 2.

* cited by examiner

DATA STREAM LOAD BALANCING UTILIZING MULTIPLE SETS OF SERVERS

FIELD

The field relates generally to data processing systems, and more particular to processing of data streams in such systems.

BACKGROUND

Data stream processing is important in a wide variety of applications, including by way of example real-time applications and near-real-time applications. In these and other data stream processing applications, latency requirements are becoming increasingly difficult to meet due to the higher volumes and rates of the data being processed. This latency issue is further complicated in data processing systems that are implemented using clusters of hundreds or thousands of commodity machines.

SUMMARY

We have recognized that in conventional data processing systems, bottlenecks can be created when processing a data stream that includes highly skewed key frequencies, or in other words, when one or more key values occur with substantially greater frequency than other key values within the data stream. Such bottlenecks can lead to undesirable increases in latency in the system.

Illustrative embodiments provide data stream load balancing utilizing multiple sets of servers. Each of the sets of servers implements a corresponding layer of a multi-layer load balancing architecture.

For example, in some embodiments a first set of servers is configured as a first load balancing layer that distributes tuples having the same key value over different ones of the servers of the first set. A second set of servers is configured as a second load balancing layer that receives partial key results from servers of the first set.

Such an arrangement ensures that data streams with highly skewed key frequencies will not create server bottlenecks within the data processing system. Accordingly, server load can be well balanced even in the presence of highly skewed key frequencies.

In one embodiment of multi-layer load balancing in a data processing system, a received data stream comprises a plurality of tuples having respective key values. The received data stream is separated into portions that are delivered to respective ones of a first set of servers in a manner that permits different tuples having the same key value to be processed by different servers of the first set. For each distinct key value, each of at least a subset of the servers of the first set maintains a corresponding partial key result based on one or more of the tuples having that key value that are received by that server. The partial key results are periodically delivered from the servers of the first set to servers of a second set of servers in a manner that ensures that different partial key results having the same key value are processed by the same server of the second set.

These and other embodiments are illustratively configured to avoid server bottlenecks even for data streams having highly skewed key frequencies, thereby reducing latency and facilitating the satisfaction of strict latency requirements in a wide variety of data stream processing applications.

Moreover, the multi-layer load balancing techniques in some embodiments can be readily scaled to accommodate data processing systems that are implemented using clusters of hundreds or thousands of commodity machines or other processing devices.

DETAILED DESCRIPTION

Illustrative embodiments of the invention will be described herein with reference to exemplary data processing systems and associated processes and processing devices. It should be understood, however, that embodiments of the invention are not limited to the particular system, process and device arrangements described, but are instead more generally applicable to any of a wide variety of different types of data stream processing arrangements in which it is desirable to provide more effective load balancing, such as in the presence of highly skewed key frequencies.

Figure 1:
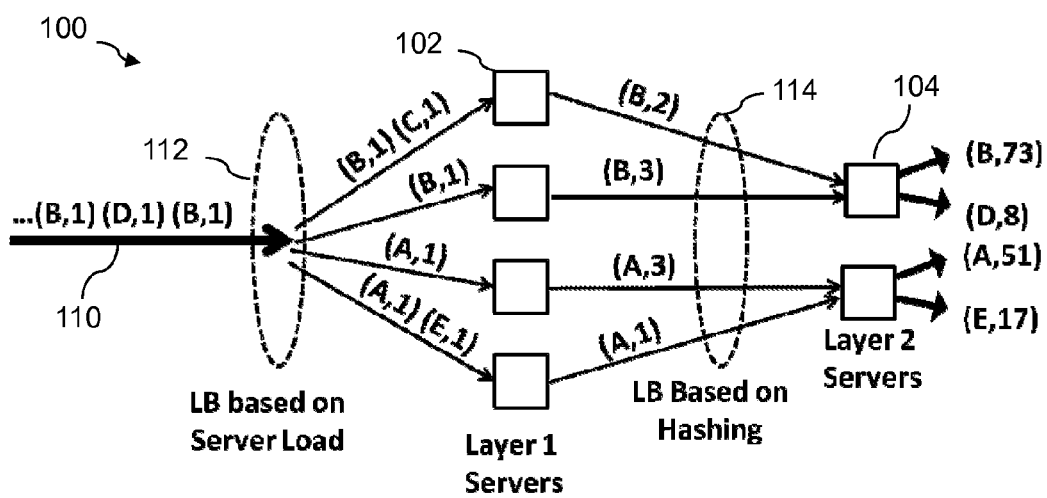
FIG. 1 shows a data processing system that implements functionality for multi-layer load balancing in an illustrative embodiment.

FIG. 1 shows a data processing system 100 that includes a first set of servers comprising Layer 1 servers 102 and a second set of servers comprising Layer 2 servers 104. In this embodiment, multi-layer load balancing is implemented using the servers 102 and servers 104 arranged in respective first and second layers denoted as Layer 1 and Layer 2. It is to be appreciated that one or more additional or alternative layers can be utilized to implement multi-layer load balancing in other embodiments.

The servers 102 and 104 are implemented using at least one processing device. For example, in some implementations, each server may be implemented on a separate processing device. Alternatively, the first set of servers 102 may be implemented on one processing device and the second set of servers 104 may be implemented on a different processing device. Other combinations of processing devices can be used in implementing the first and second sets of servers.

Figure 2:
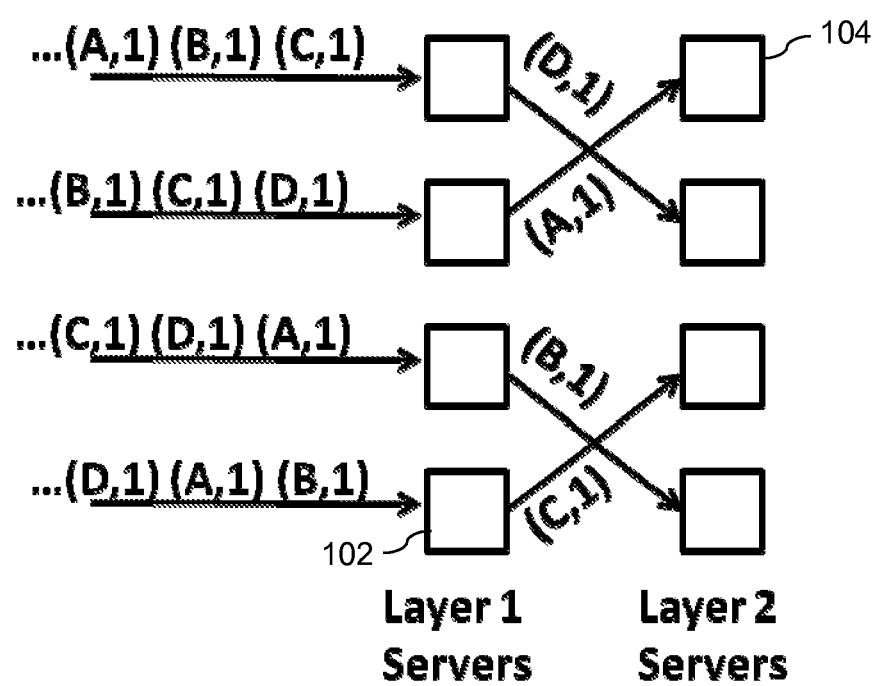
FIGS. 2 and 3 show respective examples of uniform load per key and non-uniform load per key scenarios in the FIG. 1 system.
Figure 3:
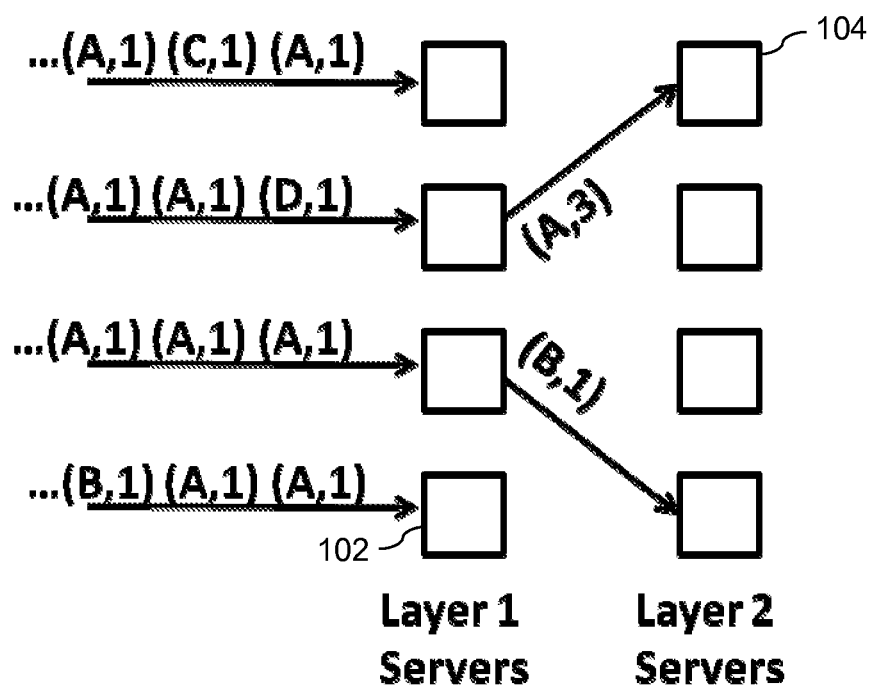

Although FIG. 1 shows four Layer 1 servers 102 and two Layer 2 servers 104, this is for clarity and simplicity of illustration only, and other related figures such as FIGS. 2 and 3 will show different numbers of servers as further examples. The particular number of servers utilized in each layer in a given embodiment will generally be dependent upon application-specific factors such as the number and type of data streams being processed, as well as the data volumes and the data rates.

In the FIG. 1 embodiment, the system 100 receives a data stream via input 110. The data stream illustratively comprises a plurality of tuples having respective key values. More particularly, as illustrated in the figure, tuples are shown as respective two-element parentheticals, each including a key value in the form of a letter (e.g., A, B, C, D, E, . . . ) and a data value in the form of a number (e.g., 1, 2, 3, . . . ). This particular tuple format is presented by way of illustrative example only, and other tuple formats can be used in other embodiments. For example, an alternative tuple format can include a key value and multiple data values. Numerous other tuple configurations comprising at least one key field and at least one additional field can be used, as will be appreciated by those skilled in the art, and embodiments of the invention are not restricted in this regard. Accordingly, the term "tuple" as used herein is intended to be broadly construed so as to encompass these and other arrangements of multiple informational elements at least one of which comprises a key value.

It is assumed for purposes of illustration that the system 100 is configured to support one or more data stream processing applications utilizing key-based grouping in which data values having the same key value are combined or otherwise grouped together for further processing. Examples include billing applications that involve aggregating usage data from multiple devices associated with a given user account in a wireless network, in which case the key may comprise a user identifier, or counting the number of search requests to identify search trends, in which case the key value may comprise the search term. The system 100 can be configured to operate in numerous additional or alternative applications relating to monitoring, searching, querying, aggregating, counting, combining or performing other functions involving streams of tuples.

At a load balancing node 112 of the data processing system 100, the data stream received at input 110 is separated into portions that are delivered to respective ones of the first set of servers 102 in a manner that permits different tuples having the same key value to be processed by different servers 102 of the first set. The separation of the data stream into portions at the load balancing node 112 is illustratively based at least in part on current processing loads of respective ones of the servers 102 of the first set, although other load balancing techniques can be used in allocating portions of the data stream to particular ones of the servers 102.

The load balancing node 112 can be implemented on a common processing device with one or more of the servers 102, or on a separate processing device or set of devices.

For each distinct key value, each of at least a subset of the servers 102 of the first set maintains a corresponding partial key result (PKR) based on one or more of the tuples having that key value that are received by that server.

The PKRs are periodically delivered from the servers 102 of the first set to the servers 104 of the second set of servers in a manner that ensures that different PKRs having the same key value are processed by the same server 104 of the second set.

In delivering the PKRs from the servers 102 of the first set to the servers 104 of the second set in the present embodiment, load balancing based on hashing is performed, in order to ensure that the different PKRs having the same key value are processed by the same server 104 of the second set. For example, the hashing may be configured such that hashing of the key value matches an identifier of a particular one of the servers 104. Other types of hashing or load balancing arrangements can be used in distributing PKRs with the same key value to a particular one of the servers 104.

By way of example, PKRs denoted (B,2) and (B,3) are delivered by first and second ones of the servers 102 of the first set to a first server 104 of the second set. Similarly, PKRs denoted (A,3) and (A,1) are delivered by third and fourth ones of the servers 102 of the first set to a second server 104 of the second set.

It is possible under some circumstances for a given PKR that is delivered from one of the servers 102 to one of the servers 104 to be based on only a single one of the tuples of the received data stream. Examples of such circumstances will be described in more detail elsewhere herein.

The servers 104 of the second set each generate full key results based on the PKRs that are received by that server. For example, the first one of the servers 104 of the second set generates a full key result (B,73) based on the PKRs (B,2) and (B,3) as well as other PKRs that it receives having the key value B. Similarly, the second one of the servers 104 of the second set generates a full key result (A,51) based on the PKRs (A,3) and (A,1) as well as other PKRs that it receives having the key value A.

In this embodiment, each of the servers 104 of the second set generates full key results for multiple key values. More particularly, the first one of the servers 104 also generates a full key result (D,8) for the PKRs that it receives having the key value D, and the second one of the servers 104 also generates a full key result (E,17) for the PKRs that it receives having the key value E.

Alternatively, the key results at the outputs of the second servers may represent respective non-final key results that are delivered to an additional set of servers for further processing to generate final key results. Such servers of the additional set may illustratively comprise Layer 3 servers of a third set of servers. It is also possible to use more than three sets of servers in other embodiments. Accordingly, the multi-layer load balancing techniques disclosed herein should not be viewed as being limited to two-layer configurations such as that shown in FIG. 1.

These and other multi-layer load balancing arrangements as disclosed herein advantageously avoid bottlenecks that can otherwise be created when processing data streams in which one or more key values occur with substantially greater frequency than other key values. Such data streams are also referred to herein as having "highly skewed key frequencies" and may be viewed as an example of what is more generally referred to herein as a data stream having a non-uniform load per key. Bottlenecks attributable to data streams with highly skewed key frequencies or other types of non-uniform load per key can seriously undermine system performance in terms of latency. These bottlenecks can arise, for example, in load balancing arrangements in which tuples are simply partitioned into groups based on key value for processing in parallel. It is apparent in such a partitioning arrangement that a data stream with highly skewed key frequency can lead to an undesirable bottleneck. As noted above, such bottlenecks are avoided in the FIG. 1 embodiment and other multi-layer load balancing arrangements disclosed herein.

The FIG. 1 embodiment separates the data stream into portions based on the relative loads of the Layer 1 servers 102 of the first set. More particularly, the Layer 1 servers are assigned substantially equal amounts of load regardless of the key value distribution. Also, since the load distribution is oblivious to the key values there is an almost equal partitioning of tuples for the same key value among the different Layer 1 servers. Thus, in this embodiment the processing of the tuples for the same key value gets load balanced across all the Layer 1 servers.

As indicated above, the system 100 is configured such that each Layer 1 server maintains an up-to-date PKR for each key value. This illustratively involves a given Layer 1 server applying a user-defined aggregation function to its received tuples. Such aggregation functions are configured on a per-key basis, such that different aggregation functions are used for different key values. Alternatively, different instances of the same aggregation function can be used for different key values.

At any given time the PKR of a given key value at a given Layer 1 server is based on the aggregation of only a subset of the tuples received by it for that key value. This is because the Layer 1 servers periodically deliver their respective PKRs to Layer 2 servers 104 of the second set. In conjunction with delivery of a given PKR value to the appropriate one of the Layer 2 servers, the corresponding Layer 1 server resets the PKR value and restarts its computation using only the newly arriving data stream tuples.

Accordingly, in the FIG. 1 embodiment, the Layer 2 servers 104 of the second set process PKRs received from the Layer 1 servers 102 of the first set rather than the original stream tuples which are sent to Layer 1 servers only. The Layer 2 servers then apply the user-defined per-key aggregation function to compute an up-to-date overall result for each of their assigned key values. As noted above, the Layer 2 servers are selected to process particular PKRs based on hashing of the key value.

The FIG. 1 embodiment is advantageously configured such that partitioning of the tuple processing between the two layers can be automatically adjusted based on the load per key. For example, if the key distribution is such that all the processing load can be handled by the Layer 2 servers 104 then the Layer 1 servers 102 mainly act as a pass-through for the stream tuples. In this case, since there are no bottlenecks at the Layer 2 servers, the PKR transfer rate between the Layer 1 servers and the Layer 2 servers can match the rate of tuple arrival. The PKRs are immediately transferred by the Layer 1 servers to the Layer 2 servers without delay. Each PKR therefore corresponds to the aggregation of a single tuple on average and hence there is virtually no processing of tuples at Layer 1.

However, if the key distribution is such that the processing load for a given key value is too high to be handled entirely by its Layer 2 server, as can happen in the case of skewed key frequencies, then the transfer of PKRs for that key value from the Layer 1 servers to the Layer 2 server is slowed down.

Consider as an example a situation in which the tuples for the given key value are arriving at a rate of $R_1$ tuples per second while the Layer 2 server can only process tuples at a maximum rate of $R_2 < R_1$ tuples per second. In this situation, backpressure from the Layer 2 server is used to force the Layer 1 servers to slow down their transfers of their respective PKRs for the given key value to a maximum aggregate rate of $R_2$ PKRs per second. Such backpressure can be implemented using transmission control protocol (TCP) congestion control on a network link into the Layer 2 server.

Assume in conjunction with the foregoing example that there are n Layer 1 servers, and that each Layer 1 server receives tuples at the rate of $R_1/n$ due to uniform load distribution of incoming tuples among the Layer 1 servers. However, each Layer 1 server transfers PKRs at an average rate of $R_2/n <_R/n$, since otherwise a Layer 2 server could receive PKRs at a rate more than $n*R_2/n = R_2$. Thus, on average a Layer 1 server in this example will process $R_1/R_2$ tuples between transfers of PKRs to the Layer 2 server.

Respective illustrative uniform load per key and non-uniform load per key cases of the foregoing example are shown in FIGS. 2 and 3. The uniform load per key cases may be viewed as illustrative of a more general uniform key distribution condition under which the PKRs correspond to respective single tuples and a rate of delivery of the PKRs from the servers of the first set to the servers of the second set substantially matches an arrival rate of the tuples at the servers of the first set. The non-uniform load per key case may be viewed as illustrative of a non-uniform key distribution condition under which at least a subset of the PKRs correspond to respective groups of multiple tuples and a rate of delivery of the PKRs from the servers of the first set to the servers of the second set is less than an arrival rate of the tuples at the servers of the first set.

Referring first to FIG. 2, a uniform load per key case is shown. In this case, the processing load is well distributed on the Layer 2 servers. It is assumed that $R_1 = R_2 = 1$ tuple per unit time for all Layer 2 servers. Thus, the PKRs are immediately transferred by the Layer 1 servers to the Layer 2 servers as respective single tuples without any delay. This is illustrated by the transfer of PKRs corresponding to respective single tuples (A,1), (B,1), (C,1) and (D,1) from the Layer 1 servers to the Layer 2 servers.

FIG. 3 shows a non-uniform load per key case. In this case, on average there are three stream tuples per unit time for key value A, such that $R_1 = 3$, but the maximum tuple processing rate for its corresponding Layer 2 server is $R_2 = 1$. Thus, each Layer 1 server on average in four time units can only transfer one PKR to the corresponding Layer 2 server, and receives three tuples with key value A. Thus, in this case each of the transferred PKR values for key value A is of the form (A,3), which corresponds to a combination of three received tuples of the form (A,1). The number of received tuples combined by a Layer 1 server to form a given PKR is also referred to herein as the "size" of the PKR, and in this case the PKR (A,3) has a size of three.

As described above, delay in transfer of PKRs from the Layer 1 servers to the Layer 2 servers can be caused by mismatch between the offered load and the processing rate of the Layer 2 servers.

Another factor that can impact this delay is the transfer scheduling mechanism implemented at the Layer 1 servers when there are multiple PKRs with distinct key values to be transferred to the same Layer 2 server. For example, one possible mechanism can be to transfer those PKRs first that have received the most processing by the Layer 1 server. In other words, transfer the PKRs of largest size first, where as noted above the size of a PKR corresponds to the number of tuples that have been aggregated to form this PKR. This mechanism is referred to herein as size-based scheduling.

Figure 4:
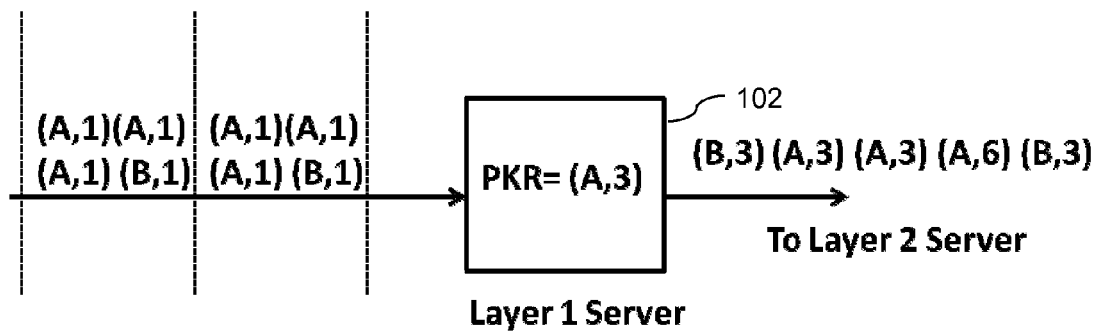
FIG. 4 illustrates partial key result size-based scheduling in a Layer 1 server of the FIG. 1 system.

An example of PKR size-based scheduling is shown in FIG. 4. Here, a given Layer 1 server 102 receives tuples for key value A at three times the frequency at which it receives tuples for key value B, such that the size of the PKR for key value A grows three times faster than that for key value B. Using the size-based scheduling approach, three PKRs of the form (A,3) are transferred to the Layer 2 server for every four time units, while only a single PKR of the form (B,3) is transferred to the Layer 2 server for every four time units, leading to a higher delay for key value B. This example illustrates that size-based scheduling can result in relatively high delays in transferring PKRs of those key values for which there are relatively fewer tuples in the received data stream.

It is also possible to use round robin scheduling for the transfer of PKRs regardless of the PKR sizes. A round robin schedule, however, should not be implemented as a static schedule, as PKRs with new key values can get added at a given Layer 1 server or PKRs for some key values may no longer be maintained by the given Layer 1 server.

Other transfer scheduling mechanisms such as those based on first come first served (FCFS) scheduling algorithms and weighted squared delay (WSD) scheduling algorithms will be described in detail below and can be configured to optimize maximum delay as well as average delay.

Figure 5:
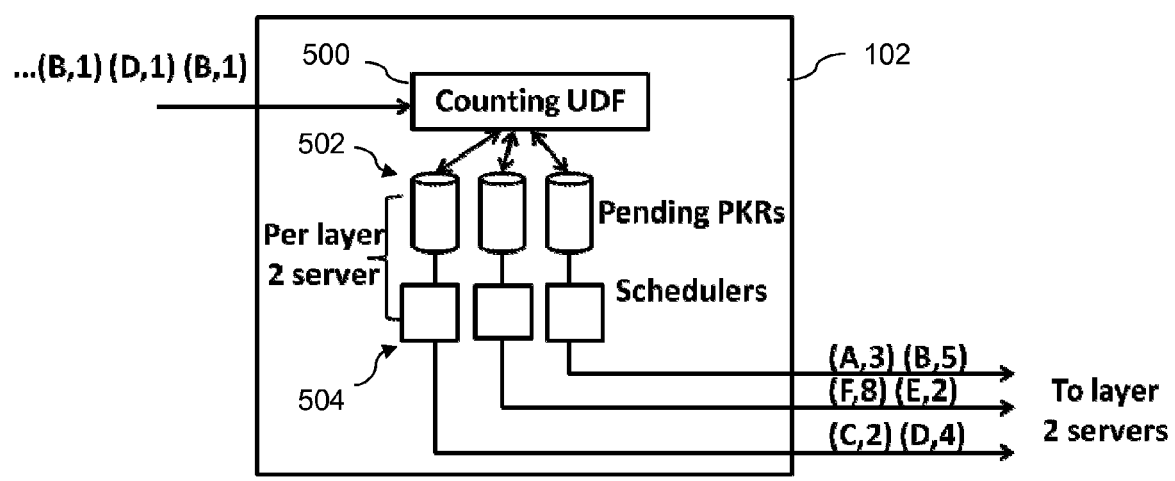
FIG. 5 shows a more detailed view of a Layer 1 server of the FIG. 1 system.

FIG. 5 shows a more detailed view of a given Layer 1 server 102 of the system 100, illustrating server components associated with computation of PKRs and scheduling of transfer of PKRs to Layer 2 servers. The Layer 1 server 102 in this embodiment comprises a counting user-defined function (UDF) 500, a plurality of storage elements 502 for storing pending PKRs for respective ones of a plurality of Layer 2 servers 104, and a plurality of schedulers 504 coupled to respective ones of the storage elements 502. The schedulers 504 are configured for scheduling transfer of PKRs from the corresponding storage elements 502 to respective ones of the Layer 2 servers 104.

The counting UDF 500 is an example of what is more generally referred to herein as an "aggregation function" that is configured to generate PKRs for received tuples having respective key values. As indicated in the figure, there is a separate storage element 502 and associated scheduler 504 for each of the Layer 2 servers that is to receive PKRs from the Layer 1 server 102. More particularly, in this embodiment, the Layer 1 server 102 delivers PKRs to three different Layer 2 servers, and thus includes three distinct storage element and scheduler pairs.

The Layer 2 servers illustratively use the same counting UDF 500 as the Layer 1 server 102 to combine different PKRs received for a given key value. Alternatively, in some embodiments the Layer 2 servers can utilize a different aggregation function than the Layer 1 servers.

The PKRs generated in Layer 1 server 102 using the counting UDF 500 are stored in the appropriate one of the storage elements 502 depending on the corresponding Layer 2 server that is to receive PKRs from that storage element. The scheduler 504 associated with a given storage element 502 and a corresponding Layer 2 server is configured to select PKRs from the given storage element for delivery to the corresponding Layer 2 server in accordance with a transfer scheduling mechanism implemented by the scheduler.

The tuples received by the Layer 1 server 102 are passed to the counting UDF 500. Upon receiving a tuple of a given key value, the counting UDF aggregates the data value contained in the received tuple with that of the PKR for the given key value and stores the result in the appropriate one of the storage elements 502.

If there is no existing PKR for a particular received tuple, the counting UDF 500 generates an initial PKR for that received tuple. An additional storage element 502 and scheduler 504 are instantiated if necessary.

The scheduler 504 for a particular Layer 2 server 104 is responsible for sending to that server the PKRs whose key values are assigned to that server. The pending PKRs in the corresponding storage elements are illustratively stored using respective data structures that each include key value, time of creation, size in number of aggregated tuples, delay and possibly other types of metadata relating to the PKR.

The scheduler 504 selects the order in which pending PKRs in the corresponding storage element 502 are transferred to the corresponding Layer 2 server. This may be achieved using a variety of different transfer scheduling mechanisms, including the FCFS and WSD scheduling algorithms to be described in greater detail below. The scheduler 504 generally attempts to keep the latency as low as possible, and thus will attempt to transfer PKRs at the highest possible rate.

As indicated above, the PKR transfer rate is limited by the processing capability of the Layer 2 server as well as the number of Layer 1 servers since many Layer 1 servers may independently transfer their PKRs to the same Layer 2 server in parallel.

After a scheduler 504 has transferred a given PKR to the corresponding Layer 2 server 104, the Layer 1 server 102 restarts the PKR computation for the associated key value. Accordingly, the data structure in storage element 502 for the transferred PKR is reset and then updated by counting UDF 500 as additional tuples having the associated key value arrive in the Layer 1 server 102.

An exemplary process for multi-stage load balancing will now be described with reference to FIG. 6. The process as illustrated includes steps 600 through 606 that are performed by one or more processing devices collectively implementing first and second sets of servers, such as Layer 1 servers 102 and Layer 2 servers 104 as previously described. The first and second sets of servers are assumed to be implemented using at least one processing device. For example, each of the servers can be implemented on a corresponding distinct processing device, or first and second processing devices can be used to implement the respective first and second sets of servers. Numerous other combinations of one or more processing devices can be used to implement first and second sets of servers for multi-stage load balancing as disclosed herein.

In step 600, a data stream is received and comprises a plurality of tuples having respective key values. For example, the tuples may comprise respective element pairs each including a key value and a data value as shown for illustrative purposes only in the embodiments of FIGS. 1 through 5. A wide variety of other types of tuples each comprising at least one key value and one or more additional data values or other elements may be used in other embodiments.

In step 602, the data stream is separated into portions that are delivered to respective ones of a first set of servers in a manner that permits different tuples having the same key value to be processed by different servers of the first set. With reference to system 100 of FIG. 1, this separation is illustratively performed based on the respective processing loads of the Layer 1 servers 102 by the load balancing node 112.

In step 604, for each distinct key value, there is maintained in each of at least a subset of the servers of the first set a corresponding PKR based on one or more of the tuples having that key value that are received by that server. For example, in the FIG. 5 embodiment, such PKRs are generated using the counting UDF 500 and stored in data structures of the storage elements 502. Other types of aggregation functions can be used in maintaining PKRs for respective key values in one of the servers of the first set.

In step 606, PKRs from the servers of the first set are periodically delivered to servers of a second set of servers in a manner that ensures that different PKRs having the same key value are processed by the same server of the second set. With reference again to system 100 of FIG. 1, this periodic delivery of PKRs is illustratively performed based on hashing of the key values. For example, hashing of the key value B yields an identifier of the first one of the Layer 2 servers 104, such that PKRs (B,2) and (B,3) are directed to that Layer 2 server. Similarly, hashing of the key value A yields an identifier of the second one of the Layer 2 servers 104, such that PKRs (A,3) and (A,1) are directed to that Layer 2 server. Of course, alternative techniques can be used to ensure that the same Layer 2 server processes all the PKRs for a given key value.

Figure 6:
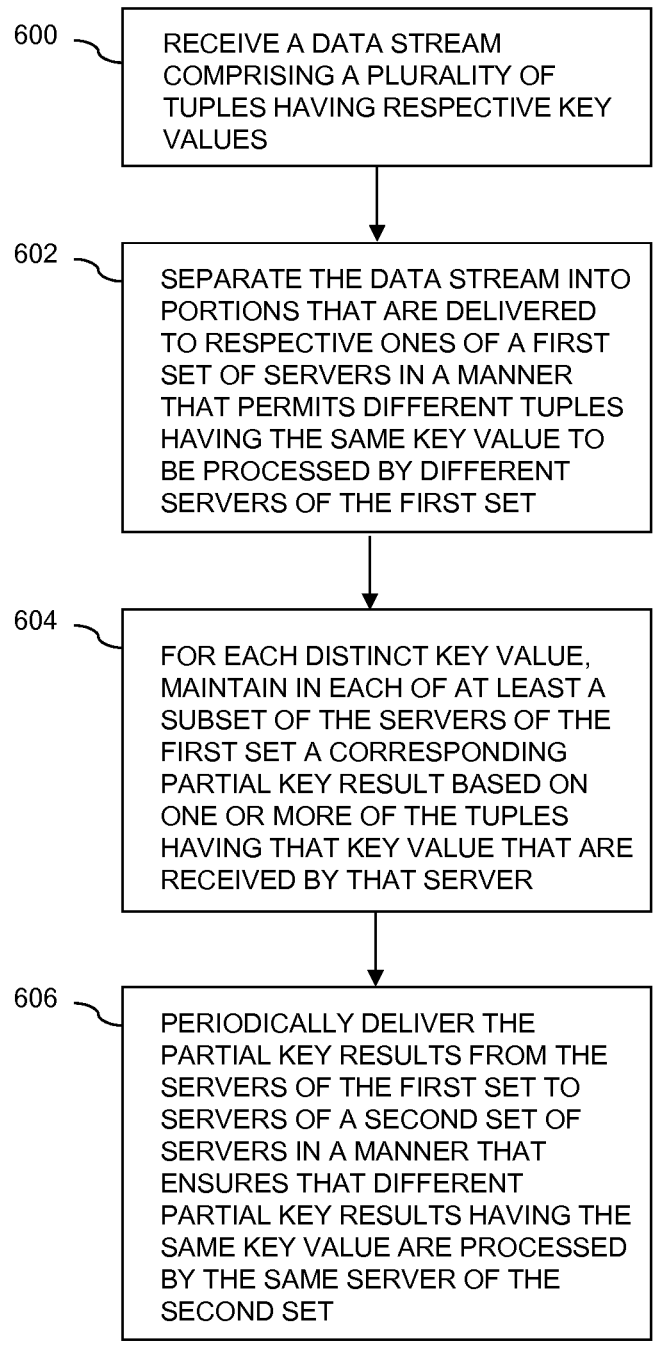
FIG. 6 is a flow diagram of an example multi-layer load balancing process implemented in the FIG. 1 system.

Although not expressly illustrated in FIG. 6, the process is assumed to further include processing the received PKRs in the servers of the second set using per-key aggregation functions in order to generate corresponding full key results for respective ones of the distinct key values. Again, in embodiments with three or more layers of load balancing, the key results generated by the servers of the second set need not be full key results, but could instead be additional PKRs that are passed on to another set of servers in another layer for further processing.

The periodic delivery in step 606 is implemented using transfer scheduling mechanisms implemented in one or more schedulers of each of the servers of the first set. For example, with reference to the FIG. 5 embodiment, a given Layer 1 server 102 implements a separate scheduler 504 for each of the Layer 2 servers 104 to which the given Layer 1 server delivers PKRs.

The periodic delivery in step 606 may illustratively involve releasing the PKRs from different ones of the servers of the first set at different times. Also, decisions to release PKRs for delivery may be made independently by each of the servers of the first set based solely on local information available to each of those servers.

For example, a given one of the servers of the first set may make decisions regarding release of PKRs using an FCFS scheduling algorithm in which a queue of PKRs is maintained at the given server and for each of a plurality of PKR delivery opportunities a PKR at a head of the queue is selected for release.

As another example, a given one of the servers of the first set may make decisions regarding release of PKRs using a WSD scheduling algorithm in which for each of a plurality of PKR delivery opportunities a PKR is selected for release based at least in part on weighted squared delay of that PKR.

Also, different ones of the servers of the first set can utilize different scheduling algorithms in determining the particular order in which PKRs should be released for delivery to servers of the second set.

It is to be appreciated in this regard that terms such as "periodically deliver" as used herein are intended to be broadly construed so as to encompass, for example, delivery in accordance with a wide variety of different types of transfer scheduling mechanisms, including without limitation mechanisms based on FCFS and WSD scheduling algorithms as disclosed herein. Accordingly, periodic delivery should not be construed as requiring particular repeating time periods.

In conjunction with delivery of a given PKR from one of the servers of the first set to one of the servers of the second set, the PKR is reset in the server of the first set, and the reset PKR is subsequently updated based on additional tuples received by the server of the first set that were not already reflected in the delivered PKR.

The particular process steps and other operations described above in conjunction with the flow diagram of FIG. 6 are exemplary only, and additional or alternative process steps or operations may be used in other embodiments. For example, certain steps shown serially in the figure can be performed at least in part in parallel with one another. Moreover, although the steps of the FIG. 6 process are described as being collectively performed primarily by first and second sets of servers, this is by way of illustrative example, and these processes or portions thereof can each be performed by other types and arrangements of processing devices.

Accordingly, the particular devices performing the process steps can be varied in other embodiments.

A number of example data stream processing applications implementable using the FIG. 6 process will now be described.

As a first example, a monitoring application may be configured to perform monitoring for threshold crossings. Such an application is more particularly configured to monitor average values on a per-key basis over sliding time windows of fixed length 6 minutes. An alarm is to be immediately raised for a key value when its average value crosses a threshold. Computing the average value can be broken down into two splittable operations, one for counting the number of tuples and the other for summing up the tuple values. In addition, these operations are restricted to the particular time window before computing the averages.

We initially consider the counting operation, and assume that the sum operation is handled in a similar way. Using techniques disclosed herein, the processing of the incoming stream tuples is distributed amongst a number of Layer 1 servers based on server load as previously described. A Layer 1 server counts its incoming tuples to compute PKRs for respective key values. Occasionally the Layer 1 server transfers its current PKR for a key value to the appropriate Layer 2 server. After transferring the PKR, the Layer 1 server restarts the counting of the incoming tuples for the particular key value from scratch. This results in a new PKR for that key value and the process continues.

The average computation and threshold crossing check is performed at the Layer 2 servers. In order to compute the average for a key value, a Layer 2 server waits until it has received the sum and count PKRs covering all the stream tuples for that key value that arrived within the last 6 minutes. Since not all such PKRs may get immediately transferred to the Layer 2 server, there can be a delay in computing the averages. The amount of inaccuracy is directly proportional to the absolute delay in transferring the PKRs and hence the scheduler can be configured to minimize this latency. More generally, the scheduler in this case is configured to minimize the maximum delay.

As a second example, a querying application may be configured to query computed values for the streamed data. Streaming data is again averaged over sliding time windows, with Layer 1 servers computing the sum and count PKRs for respective key values, and the Layer 2 servers computing the averages. Queries are issued to the Layer 2 servers to obtain the average computed for the tuples that arrived over the last 6 minutes for a specified key value. A query has to wait until the computation of the average finishes at the Layer 2 servers. Thus the query gets delayed by a time which is directly proportional to the delay in transferring the PKRs for its key values. The queries however are issued at random times. Accordingly, the scheduler in this case can be configured to minimize the average delay in transferring the PKRs from Layer 1 to Layer 2 servers.

Again, the foregoing are only examples, and numerous other data streaming applications can benefit from use of multi-layer load balancing as disclosed herein.

Figure 7:
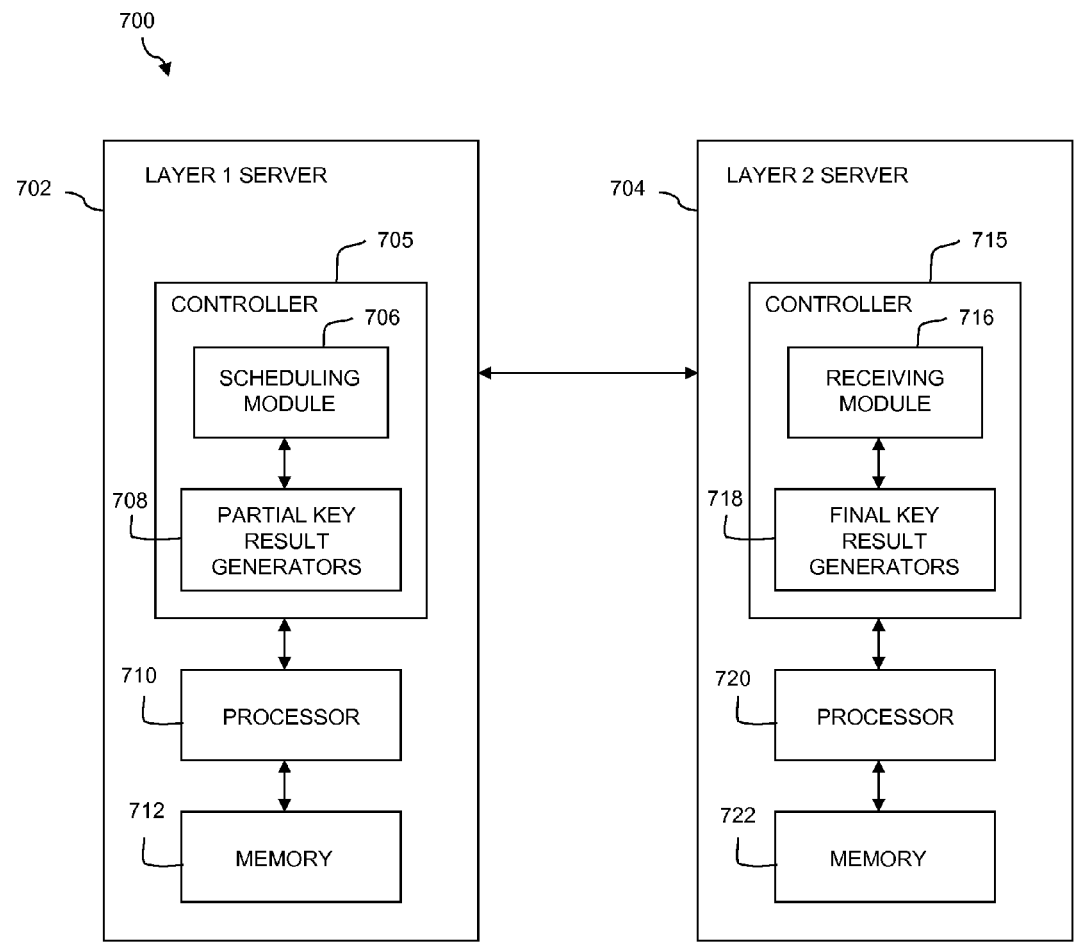
FIG. 7 is a block diagram showing processing devices implementing respective Layer 1 and Layer 2 servers of the FIG. 1 system.

Referring now to FIG. 7, a portion 700 of the data processing system 100 includes first and second processing devices 702 and 704. It is assumed that the first processing device 702 more particularly comprises a Layer 1 server and that the second processing device 704 more particularly comprises a Layer 2 server, although other configurations are possible. For example, a given processing device can operate as both a Layer 1 server with respect to one data stream and as a Layer 2 server with respect to another data stream. Accordingly, a given processing device as that term is broadly used herein may comprise both Layer 1 and Layer 2 server functionality.

In the FIG. 7 embodiment, the first processing device 702 is adapted for communication with the second processing device 704, and vice versa. The first processing device 702 comprises a controller 705 that includes a scheduling module 706 coupled to PKR generators 708. The first processing device 702 further comprises a processor 710 coupled to the controller 705 and to a memory 712. The second processing device 704 comprises a controller 715 that includes a receiving module 716 coupled to final key result generators 718. The second processing device 704 further comprises a processor 720 coupled to the controller 715 and to a memory 722.

Also in the FIG. 7 embodiment, PKRs are delivered from the first processing device 702 to the second processing device 704 utilizing the scheduling module 706 and the receiving module 716.

Although processing devices 702 and 704 are shown adjacent to one another in the figure, this is for simplicity and clarity of illustration only, and these processing devices may of course communicate with one another through one or more additional processing devices that are not explicitly shown. For example, processing devices 702 and 704 may illustratively communicate with one another via other processing devices, such as switches, routers or other types of network devices.

The processors 710 and 720 may each be implemented utilizing a microprocessor, a microcontroller, an application-specific integrated circuit (ASIC), a field-programmable gate array (FPGA), or other type of processing circuitry, as well as portions or combinations of such processing circuitry. These processors may include one or more embedded memories as internal memories.

The processors 710 and 720 and any associated internal or external memory may be used in storage and execution of one or more software programs for controlling the operation of the corresponding processing devices 702 and 704. Accordingly, one or more of the modules 706 and 708 of controller 705 in processing device 702, one or more of the modules 716 and 718 of controller 715 in processing device 704, or portions of these modules, may be implemented at least in part using such software programs.

Each of the memories 712 and 722 of the processing devices 702 and 704 is assumed to include one or more storage areas that may be utilized for program code storage. The memory 712 or 722 may therefore be viewed as an example of what is more generally referred to herein as a computer program product or still more generally as a processor-readable storage medium that has executable program code embodied therein. Articles of manufacture comprising such computer program products or other processor-readable storage media are considered embodiments of the invention.

The memory 712 or 722 may more particularly comprise, for example, an electronic random access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices. Accordingly, other examples of processor-readable storage media as that term is broadly used herein may include disks or other types of magnetic or optical media, in any combination.

The processor, memory, controller and other components of a given processing device of data processing system 100 may include well-known circuitry suitably modified to implement at least a portion of the multi-layer load balancing functionality described above. Conventional aspects of such circuitry are well known to those skilled in the art and therefore will not be described in detail herein.

It is to be appreciated that the particular arrangement of processing device components shown in FIG. 7 is exemplary only, and numerous alternative processing device configurations may be used in other embodiments. For example, the processing devices can be configured to incorporate additional or alternative components and to support a variety of different communication protocols.

Additional details regarding the transfer scheduling mechanisms implemented in illustrative embodiments will now be provided. As noted above, these transfer scheduling mechanisms in some embodiments are implemented in Layer 1 servers such as servers 102 of the system 100 in FIG. 1 and are used to control periodic delivery of PKRs to Layer 2 servers such as servers 104 of system 100. Accordingly, the disclosed transfer scheduling mechanism may be implemented, for example, in schedulers 504 of FIG. 5 or in scheduling module 706 of FIG. 7.

The transfer scheduling mechanisms are illustratively implemented to optimize system performance metrics such as transfer latency for the PKRs.

The stream delay may be characterized in the following manner. A PKR a for a key value K can be associated with the set of stream tuples whose aggregation result it holds. Let I be one such tuple associated with PKR a. Let I arrive at the Layer 1 server at time $t_1$. Let $t_2$ be the time when the PKR a is transferred to the Layer 2 server. Thus $t_2 \geq t_1$ and there is a delay of at least $t_2 - t_1$ in the time between the arrival of I and it having an effect on the overall aggregate value for key value K that is being computed at the Layer 2 server. We refer to this delay $t_2 - t_1$ as the stream tuple delay for the tuple I of key value K.

Let I be the tuple with the earliest arrival time $t_1$ amongst the tuples associated with PKR a. Note that the computation of PKR a was initiated at time $t_1$. We refer to time $t_1$ as the start time of PKR a. The end time of PKR a is defined as the time when it is transferred to the Layer 2 server, such that the PKR only exists in the time interval $(t_1, t_2)$. We denote the length of this time interval $t_2 - t_1$ for PKR a as the PKR delay for a. Note that the PKR delay for a is also the maximum stream tuple delay among all the tuples I that are associated with PKR a. Finally, the maximum of the PKR delays for all key values at all times is denoted by $d_{max}$ and is referred to as the maximum stream delay of the system.

The foregoing describes the delay in terms of time. However, other definitions are possible. For example, we can use the term $n_{max}$ to denote the maximum stream delay of the system when the delay is measured in terms of number of PKRs transfers. Let a be a PKR with interval $(t_1, t_2)$ with key value that hashes to a Layer 2 server $N_2$. We define the delay of a, under this metric, to be the number of PKRs of any key value transferred by the Layer 1 server to Layer 2 server $N_2$ in the time interval $(t_1, t_2)$. The maximum stream delay $n_{max}$ under this metric is then the maximum of the PKR delays for all PKRs a seen by the system. Note that if it takes a fixed time to transfer any PKR from a Layer 1 server to a Layer 2 server then the delay of PKR a under the $n_{max}$ metric is directly proportional to $t_2-t_1$, the time-based PKR delay for a, thus making the two measures equivalent. Therefore in this case the $n_{max}$ metric is equivalent to the $d_{max}$ metric. However, if the transfer time can be non-uniform, due to varying network congestion or other factors, then the two metrics can differ significantly, particularly when the time-based delay metric is the maximum delay rather than the average delay.

As previously described in conjunction with FIG. 5, a given Layer 1 server illustratively comprises a separate scheduler 504 per Layer 2 server. Each of these schedulers is only responsible for transferring those PKRs whose key values are assigned to its corresponding Layer 2 server.

In some embodiments, a given scheduler S associated with a pair of Layer 1 and Layer 2 servers is configured to operate in an online manner to decide which PKR of the Layer 1 server to transfer next to the Layer 2 server, from those PKRs having key values that hash to the identifier of the Layer 2 server. The scheduler S only makes use of the local state information of the Layer 1 server, including PKR metadata. In addition, S is illustratively configured to operate in a distributed manner without any centralized control and without knowing the state of the other schedulers implemented on other Layer 2 servers that are also transferring PKRs to this Layer 2 server.

It should be noted that an "online" scheduler as the term is used herein operates only with local knowledge of the corresponding server based on arriving tuples. In contrast, an "offline" scheduler works under full advanced knowledge of the system and is able to compute the best schedule in an offline setting. Although some embodiments utilize offline schedulers, other types of schedulers can be used in other embodiments.

The scheduler S for a pair of Layer 1 and Layer 2 servers may be configured such that the maximum stream delay is minimized. Here we use the more general delay metric n, that is based on number of PKR transfers. As described earlier, optimizing delay under this metric is equivalent to optimizing the time-based delay metric $d_{max}$ when transfer times are fixed.

The scheduler S for a pair of Layer 1 and Layer 2 servers may alternatively be configured such that the average stream delay of the system is minimized. Here we use the time-based delay metric $d_{max}$, along with per-key weights that reflect tolerance to delays, when computing the weighted averages.

It should be noted that the above-noted schedulers configured to minimize the maximum stream delay or the average stream delay are exemplary only, and other types of schedulers configured to optimize other types of metrics can be implemented in other embodiments.

As described above, the scheduler S may be configured for a single pair of Layer 1 and Layer 2 servers. In the following description, we denote the Layer 1 server by $N_1$ and the Layer 2 server by $N_2$. The scheduler S in an online manner selects the order of transferring PKRs from $N_1$ to $N_2$. Note that S only has to deal with those PKRs at server $N_1$ whose key values hash to server $N_2$.

We denote the number of distinct PKR key values by s. The following functions apply to a given PKR a. The function r(a) is the start time of a as was defined before. The function c(a) is its end time, corresponding to the time when this PKR finishes getting transferred by $N_1$ to $N_2$. The function w(a) gives the overall wait time in the particular metric for the PKR a. The function s(a) gives the index of the key value K(a) of a and hence ranges from 1 to s. The function $f(a)$ gives the identity of the earliest arriving tuple in a of key value K(a), with ties broken arbitrarily. In other words, $f(a)$ arrived at time r(a) causing the initiation of the maintenance of the PKR a at $N_1$.

A scheduler S for minimizing the maximum stream delay will now be described in more detail. In this embodiment, S implements an FCFS scheduling algorithm that selects the PKRs for transfer based on their arrival or start times. It can be shown that for the FCFS scheduler S to be described, the maximum stream delay stays within a bound given by two times the maximum stream delay of an optimal offline scheduler that operates under full future knowledge of the system.

We first describe a data structure D utilized by the scheduler. The scheduler S holds the information about the pending PKRs in D. The data structure D comprises a queue Q and a hash table H. For a given PKR a, K(a) denotes its key value. When PKR a is created or updated by the UDF, the scheduler S is informed. S checks if it already holds information for this PKR by looking up the hash table H via the key value K(a). If this PKR is not already in H then the key value pair (K(a), p(a)) is inserted into the hash table H. Here p(a) is a pointer to the PKR a. In addition, the key value K(a) is inserted at the end of the queue Q. On the other hand, if the key value pair for PKR a is already in H then no changes are made to the data structure D.

When the scheduler decides to transfer the PKR a to the Layer 2 server $N_2$, it locks the PKR a so that no more changes can be made to it by the UDF. S then removes the key value pair for PKR a from the hash table H as well as deletes the key K(a) from the queue Q. The removal from H may be done, for example, via a constant-time hash deletion operation. It can be shown that the PKR a selected by the scheduler for transfer is always at the head of the queue Q and therefore the deletion of the key K(a) from the queue Q is also a constant-time operation. Once the PKR a is locked and removed from D by S then any new stream tuples with key value K(a) are aggregated into a different PKR a' for the key value K(a). Just as described earlier, information about this PKR is maintained in D and the process repeats.

As noted above, the scheduling algorithm utilized by scheduler S in this embodiment is a type of FCFS scheduling algorithm. More particularly, the scheduler S is configured such that, whenever there is an opportunity to transfer a PKR to server $N_2$, the scheduler S selects the PKR a at the head of the queue Q. Thus, the scheduler S repeatedly removes the PKR a from the head of the queue Q and sends it to $N_2$.

It can be shown that this FCFS scheduler S has a good worst case performance. However, due to unpredictable variability in the performance of the servers, the delay metric can become arbitrarily large compared to what is achievable in an optimal offline scheduler. Such issues can be addressed by using the delay metric $n_{max}$, which is based on the number of PKRs transferred.

As described previously, the n, metric is also more general than the time-based delay metric $d_{max}$, with the two metrics coinciding when the processing of PKRs by the Layer 2 server happens at a rate that does not vary much with time. In particular, a consequence of bounding the maximum delay under the $n_{max}$ metric is that the same bound holds under the $d_{max}$ metric when Layer 2 servers are able to process the PKRs at a fixed rate.

The PKR processing rate of $N_2$ may not be constant but can vary with time depending on the variability in the CPU usage of the UDFs used for processing the PKRs as well as due to the variation in the load handled by the other applications running on $N_2$. This can have a particularly adverse impact on the performance under the maximum delay metric. This is because all the scheduler choices in this embodiment are assumed to be made in an online manner, without knowledge of the future loading on $N_2$. Therefore it is possible that in some situations, right after many PKRs get accumulated at $N_1$, there can be a steep drop in the processing rate of $N_2$, thus causing significant delays to at least one of the waiting PKRs. Even if such events are very rare, their impact on the maximum delay metric can be significant. In particular the maximum delay, under any online scheduler S, can become arbitrarily large if there is unbounded variability in the processing rate of $N_2$.

On the other hand, an optimal offline scheduler operates under full knowledge of the variability in the PKR processing rate of $N_2$ as well as with the knowledge of the tuple arrival process at $N_1$. Hence, the optimal offline scheduler can adjust its schedule to avoid significant accumulations of PKRs just before any steep drop in the processing rate of $N_2$, thus ensuring that the maximum delay is kept bounded. This implies that under high variability in the PKR processing rate the maximum PKR delay for any online scheduler is likely unbounded compared to an optimal offline scheduler when the comparison is based on a time-based delay metric only.

Consider an optimal offline scheduler that operates under full knowledge of the variability in the PKR processing rate of $N_2$ as well as with the knowledge of the tuple arrival process at $N_1$. Let the PKR processing rate of $N_2$ become very low at time t. The optimal offline scheduler knows this and since it also knows which tuples are arriving when, it can arrange the transfer of the PKRs in such a way that most PKRs are transferred by time t even if that involves introducing significant delay in transferring some of the PKRs. The online scheduler S on the other hand does not know what will happen in the future. Thus it schedules the PKR transfers in an online manner and tries to keep the delay of all PKRs as low as possible. As a result at time t the scheduler S may still end up having many PKRs left to transfer.

Let S have n times more PKRs left to transfer at time t compared to the optimal offline scheduler. Thus if it takes d time units for the optimal offline scheduler to transfer all its PKRs after time t then it will take nd time units for S to do the same for its PKRs. Thus one of the PKRs is delayed as much as nd time units under S. Since starting from time t the processing rate of $N_2$ stayed very low, nd can be very large, even much larger than the maximum delay of any PKR under the optimal offline scheduler before time t. Also, after time t the maximum delay for PKRs under the optimal offline scheduler is n times less than that under S, where n can also be very large. This shows that under high variability in the PKR processing rate the maximum PKR delay for any online scheduler is likely unbounded compared to an optimal offline scheduler when the comparison uses a time-based delay metric.

It can be shown that under the n, metric, however, the maximum PKR delay for the FCFS online scheduler S is bounded compared to an optimal offline scheduler.

As described above, $n_{max}$ denotes the maximum stream delay of the system when the delay is measured in terms of number of PKR transfers. In particular, for a PKR a with interval $(t_1, t_2)$, the delay of a, under this measure, is the number of PKRs of any key value transferred from $N_1$ to $N_2$ between the time interval $(t_1, t_2)$. In this definition of delay we count any PKR whose transfer was already in progress at time $t_1$. For simplicity however in our analysis we will assume that these boundaries coincide. In other words we assume that all PKR transfers end before or at time $t_1$ and all PKR transfers start at or after time $t_1$. Our analytic results also extend to the more general case.

We now define some additional notations that apply to a given PKR a. As described previously, the function w(a) gives the overall wait time. Here it is based on the metric $n_{max}$. In other words, w(a) is the number of PKRs transferred between the time interval (r(a), c(a)) from server $N_1$ to server $N_2$, including the transfer of a. Note that the performance of the FCFS scheduler S is measured by $W_{FCFS}=\max_a w(a)$. Here the maximum is over all PKRs of all of the s different key values that are transferred from $N_1$ to $N_2$ at any time.

We denote by $W_{OPT}$ the corresponding performance of an optimal offline scheduler which operates with full advanced knowledge of the system. It can be shown that $W_{FCFS} \leq 2 W_{OPT}$.

In addition, as noted above, the FCFS scheduler S provides good worst case performance. More particularly, it can be shown that, even under the delay metric $d_{max}$, no online scheduler can have performance better than $2-\varepsilon$ times the performance of the optimal offline scheduler, for any constant $\varepsilon > 0$.

We now describe a scheduler S that minimizes the average stream delay. We first formally define this metric. Consider a query that arrives at time t at $N_2$ for a key value K. Let a be the PKR at server $N_1$ for key value K at time t. The query has to wait for time c(a)-t, the delay in transferring a to $N_2$. This applies to any query that arrives at a time t that falls in the range (r(a), c(a)). We denote by $q_i(t)=c(a_i)-t$ the wait time of a query for PKR a, that arrives at time t. Here, a, denotes the PKR with index $s(a_i)=i$. Thus $q_i(t)$ can be defined for all times t and for all $1 \leq i \leq s$. Assuming that the queries are uniformly distributed, the average query wait time is obtained by taking an average of all possible values of $q_i(t)$:

$$\frac{1}{sT}\sum_t \sum_{i=1}^s q_i(t)$$

Here, the averaging is done over a long enough time period T and s is the number of different key values for the PKRs.

It should be noted that some queries may be more sensitive to lower wait times than others. For example, if the stream tuples for a key value are arriving at a very low rate then the query value, corresponding to the tuple average, may not change significantly between time t and time t+δ, for small δ, and therefore the additional wait is much more tolerable. This may not be the case when the stream tuples for a key value are arriving at a very high rate. Therefore we may want to ensure that the query wait times for more frequent key values are lower, possibly at the expense of the less frequent key values.

We model this using a weighting parameter $b_i$, with one such weight per key value. To ensure that keys with higher rate have lower delay we can set their $b_i$ values relatively higher, in proportion to their rate. The wait time for the keys is then weighed by these parameters before computing the overall average wait time. Thus, the goal is to minimize a weighted average wait time given by:

$$A = \frac{1}{sT}\sum_t \sum_{i=1}^s b_i q_i(t)$$

As described above, in this equation, $q_i(t)=c(a_i)-t$, where for PKR a, the key index $s(a_i)=i$. We assume that the $b_i$ values are fixed for the duration of the time interval T. This is a reasonable assumption as the $b_i$ values (e.g., if they are proportional to rate of arrival) can be assumed to be the average values over T.

The scheduler S is configured to minimize the average wait time A described above. The scheduler incorporates the $b_i$ values in its scheduling decision. In the case where the $b_i$ values are specified by the application, they could be directly passed to the scheduler S. If the $b_i$ values are based on the rate of arrival of the stream tuples then these rates can be estimated at the Layer 1 servers and be made available to the scheduler S.

In this embodiment, a data structure D again holds the information about the pending PKRs. It includes the hash table H holding the key value pair (K(a), p(a)) for every PKR a whose information is currently being tracked at $N_1$. Here p(a) is a pointer to the PKR a. In addition, D may also maintain average rate information for each key value if this information is used to derive the $b_i$ values.

The scheduling algorithm utilized by scheduler S in this embodiment is a type of WSD scheduling algorithm. More particularly, the scheduler S is configured such that S selects the PKRs for data transfer utilizing the current delay $d_i(t)$ for the PKR $a_i$ of key index i at time t. Note that, $d_i(t)=t-r(a_i)$ is the amount of time PKR a, has waited so far at $N_1$ to get transferred to $N_2$. On its next opportunity at time t the scheduler S selects that PKR a, for data transfer for which the following weighted square of its delay is maximum, with ties broken by a consistent order, such as based on key indexes:

$$\max_i b_i d_i(t)^2$$

The WSD algorithm in this embodiment computes the maximum of many time dependent functions $b_i d_i(t)^2$. One possible approach is to compute these functions every time the scheduler S has the opportunity to transfer a PKR. However, this can take an amount of time that is linear in the number of different key values s. Since s can be very large, a linear time algorithm may not be very practical.

Instead, it is possible to make use of a kinetic heap, examples of which are described in H. Kaplan et al., "Faster kinetic heaps and their use in broadcast scheduling," SODA, pp. 836-844, 2001, which is incorporated by reference herein. A kinetic heap is a priority queue in which the stored values, instead of being static, can be a linear function of time. The kinetic heap supports all basic heap operation including inserting values, finding the current maximum value, and deleting a minimum or maximum value. There are implementations of the kinetic heap, such as those described in the above-cited reference, in which all these three basic operations, except the delete, take O(log n) amortized time. The delete operation takes O(log n log log n) amortized time. Here n is the maximum number of different functions in the kinetic heap at any given time.

To make use of the kinetic heap data structure, we convert our functions which are non-linear functions of time into linear functions of time. This conversion recognizes that computing $\max_i b_i(t-r(a_i))^2$ is equivalent to computing $$\max_i \sqrt{b_i}(t-r(a_i)) = \max_i (t\sqrt{b_i} - r(a_i)\sqrt{b_i})$$

Thus the functions to be tracked in the kinetic heap are of the form xt+b with real numbers $x=\sqrt{b_i}$, and $y=r(a_i)\sqrt{b_i}$. At insertion time (when the computation of PKR $a_i$ is initiated) the y value is computed based on the $r(a_i)$ value, which is just the time t of insertion, and the fixed value $b_i$ for the PKR. The next PKR to be transferred is selected using the find maximum operation of the kinetic heap. The selected PKR $a_i$ is transferred to $N_2$ and its function is deleted from the kinetic heap.

The WSD scheduler S described above exhibits good performance for the previously-defined average wait time metric. In particular, the average wait time with the WSD scheduler S is no more than two times the average wait time with an optimal offline scheduler that works under full advanced knowledge of the system and is able to compute the best schedule in an offline setting. Accordingly, the WSD scheduler S implements a 2-approximation scheduling algorithm.

Simulations were performed to demonstrate the performance advantages of the above-described exemplary FCFS and WSD implementations of scheduler S. In these simulations, a distributed system was modeled to include 100 servers on each of the two layers. We uniformly partitioned a million key values K among the 100 Layer 2 servers. Thus each pair of Layer 1 and Layer 2 servers, respectively denoted $N_1$ and $N_2$, deals with 10000 distinct keys. We limited the per-server processing rate to 10000 tuples per second, giving a total system throughput of 1M tuples per second. We used a Zipf distribution to model the data arrival rates for the key values. More particularly, the data for the i-th key value arrives at a rate that is proportional to 1/i. We assigned H "hot" key values to $N_2$. These H hot key values, 0≤H≤100, correspond to key values having respective lower key indexes, and therefore appear at significantly higher frequencies in the received data stream in accordance with the Zipf distribution. The remaining 10000-H key values assigned to $N_2$ are selected randomly from the remaining K-H key values. For the WSD scheduler, we set $b_i=100$ for the hot key values assigned to $N_2$ and $b_i=1$ for the other key values assigned to $N_2$. This is to ensure that the tuples for the hot key values received lower delays. All simulations were run for the duration of an hour each.

The simulations indicated that the FCFS scheduler performs better than the WSD scheduler on the maximum delay metric, with further improved performance over the WSD scheduler as key skew, represented by the value of H, increases. At balanced key distribution, corresponding to an absence of hot key values or H=0, the FCFS scheduler has virtually no delays, other than the delay of transferring PKRs, even in the worst case. Also, the maximum delay remains bounded, at less than 2.2 seconds, even when more than one third of the system load is concentrated on $N_2$ (H=100). The FCFS scheduler also performs better than the WSD scheduler on average delay since the WSD scheduler tries to keep the delay small for hot key values but does so at the expense of many other key values. For example, it was found that the WSD scheduler was almost three times better than the FCFS scheduler in keeping the weighted delay lower by bringing down the delay for the hot key values.

Accordingly, the simulations indicate that the exemplary FCFS and WSD schedulers described above provide a tradeoff opportunity that can be utilized to meet the particular requirements of a given system implementation. Again, these two schedulers are only examples, and numerous other schedulers can be used in scheduling transfer of PKRs from Layer 1 servers to Layer 2 servers in other embodiments.

Illustrative embodiments can provide significant advantages relative to conventional arrangements. For example, these embodiments can be configured to ensure that data streams with highly skewed key frequencies will not create server bottlenecks within the data processing system. Accordingly, server load can be well balanced even in the presence of highly skewed key frequencies.

These embodiments can reduce latency and facilitate the satisfaction of strict latency requirements in a wide variety of data stream processing applications. In addition, latency remains low under both uniform and non-uniform key distributions. Schedulers can be implemented using FCFS, WSD or other scheduling algorithms so as to achieve desired bounds on metrics such as maximum delay or average delay.

The disclosed techniques can be adapted for use in a wide variety of different types of data processing systems. For example, the multi-layer load balancing techniques in some embodiments can be readily scaled to accommodate data processing systems that are implemented using clusters of hundreds or thousands of commodity machines or other processing devices.

It should be noted that a multi-layer load balancing architecture as disclosed herein can in some embodiments be implemented as a drop-in replacement for an otherwise conventional load balancing architecture, without requiring any changes in the interface or capabilities exposed to the user. In such an arrangement, the application logic used for grouping tuples should be splittable. This is the case for common streaming operations such as counting, adding and averaging values. Moreover, operators used in streaming applications tend to be commutative and associative and are therefore splittable as well. This is because typically in streaming systems the computation has to be performed and results have to be updated just with the tuples seen so far without having to wait for delayed tuples or any tuples that may arrive out of order.

As mentioned previously, illustrative embodiments can be implemented in a wide variety of different data stream processing applications. These include, by way of example only, monitoring, security, billing and ad-placement applications. In such example applications, the multi-stage load balancing techniques disclosed herein can be used to facilitate the satisfaction of stringent latency requirements relating to functions such as identification of trends, raising of alarms, commencement of billing and serving of ads. Again, these particular applications are just examples, and similar advantages can be obtained in numerous other data stream processing applications.

It was indicated above that embodiments of the present invention may be implemented in the form of articles of manufacture or other types of processor-readable storage media each comprising one or more software programs that are executed by one or more processing devices of a data processing system.

Also, embodiments of the present invention may be implemented in one or more ASICS, FPGAs or other types of integrated circuit devices, in any combination. Such integrated circuit devices, as well as portions or combinations thereof, are examples of "circuitry" as that term is used herein.

A wide variety of other arrangements of hardware and associated software or firmware may be used in implementing embodiments of the invention.

It should again be emphasized that the embodiments described above are for purposes of illustration only, and should not be interpreted as limiting in any way. Other embodiments may use different types of system, device and module configurations, and alternative layering arrangements and associated processing operations for implementing multi-layer load balancing functionality in a data processing system. Also, it should be understood that the particular assumptions made in the context of describing the illustrative embodiments should not be construed as requirements of the invention. The invention can be implemented in other embodiments in which these particular assumptions do not apply. These and numerous other alternative embodiments within the scope of the appended claims will be readily apparent to those skilled in the art.

What is claimed is:

1. A method comprising:
   receiving a data stream comprising a plurality of tuples having respective key values;
   separating the data stream into portions that are delivered to respective ones of a first set of servers to permit different tuples having the same key value to be processed by different servers of the first set;
   for each distinct key value, maintaining in each of at least a subset of the servers of the first set a corresponding partial key result based on one or more of the tuples having that key value that are received by that server such that a first one of the servers of the first set maintains a first partial key result for a first key value and at least a second one of the servers of the first set maintains a second partial key result for the first key value; and
   periodically delivering the partial key results from the servers of the first set to servers of a second set of servers to ensure that different partial key results having the same key value are processed by the same server of the second set;
   wherein the first and second sets of servers are implemented using at least one processing device;
   wherein a given partial key result for a particular key value maintained in a given one of the servers of the first set is based at least in part on a number of tuples having the particular key value that are received by the given server; and
   wherein a rate of delivery of the partial key results from the servers of the first set to the servers of the second set varies as a function of (i) a rate at which tuples having a given one of the key values are processed by at least a given one of the servers of the second set and (ii) an arrival rate of tuples having the given key value.

2. The method of claim 1 wherein at least one of the partial key results is based on only a single one of the tuples.

3. The method of claim 1 wherein separating the data stream into portions that are delivered to respective ones of a first set of servers further comprises separating the data stream into portions based at least in part on current processing loads of respective ones of the servers of the first set.

4. The method of claim 1 wherein maintaining the given partial key result for the particular key value in the given server further comprises generating the given partial key result by applying an aggregation function to the tuples having the particular key value that are received by the given server.

5. The method of claim 4 further comprising resetting the given partial key result in the given server subsequent to delivery of the given partial key result to one of the servers of the second set.

6. The method of claim 1 wherein periodically delivering the partial key results from the servers of the first set to servers of the second set further comprises releasing the partial key results from different ones of the servers of the first set at different times.

7. The method of claim 1 wherein decisions to release partial key results for delivery are made independently by each of the servers of the first set based solely on local information available to each of said servers of the first set, wherein said local information available to one of said servers of the first set is not available to the other ones of said servers of the first set.

8. The method of claim 1 wherein the given server stores partial key results using a data structure comprising a queue and a hash table, the queue storing pending partial key results for respective key values and the hash table including entries for a plurality of key values for which respective partial key results are currently maintained in the queue, with updates to pending partial key results based on tuples arriving at the given server being made in place within the queue, and wherein for an arriving tuple with a key value indicated by the hash table as not having a corresponding partial key result in the queue, the hash table is updated to include an entry for that key value and a partial key result is generated for that key value and inserted at a back of the queue.

9. The method of claim 1 wherein the given server makes decisions regarding release of partial key results using a first come first served scheduling algorithm in which a queue of partial key results is maintained at the given server and for each of a plurality of partial key result delivery opportunities a partial key result at a head of the queue is selected for release.

10. The method of claim 9 wherein the first come first served scheduling algorithm is configured to minimize a stream delay metric comprising one of a time-based delay metric and a delay metric based on a number of partial key result transfers.

11. The method of claim 1 wherein the given server makes decisions regarding release of partial key results using a weighted squared delay scheduling algorithm in which for each of a plurality of partial key result delivery opportunities a partial key result is selected for release based at least in part on weighted squared delay.

12. The method of claim 11 wherein the weighted squared delay scheduling algorithm is configured to minimize an average stream delay metric.

13. The method of claim 1 wherein the given server makes decisions regarding release of partial key results using a scheduling algorithm based on a kinetic heap data structure in which a plurality of functions that are non-linear functions of time are converted into corresponding functions that are linear functions of time so as to be utilizable with the kinetic heap data structure.

14. The method of claim 1 wherein periodically delivering the partial key results from the servers of the first set to servers of the second set further comprises delivering the partial key results based at least in part on key value hashing operations configured to ensure that different partial key results having the same key value are processed by the same server of the second set.

15. The method of claim 1 further comprising processing the received partial key results in the servers of the second set using one or more aggregation functions in order to generate corresponding full key results for respective ones of the distinct key values.

16. The method of claim 1 wherein under a uniform key distribution condition the partial key results correspond to respective single tuples and the rate of delivery of the partial key results from the servers of the first set to the servers of the second set substantially matches an arrival rate of the tuples at the servers of the first set.

17. The method of claim 1 wherein under a non-uniform key distribution condition at least a subset of the partial key results correspond to respective groups of multiple tuples and the rate of delivery of the partial key results from the servers of the first set to the servers of the second set is less than an arrival rate of the tuples at the servers of the first set.

18. An apparatus comprising:
at least one processing device comprising a processor coupled to a memory;
said at least one processing device implementing at least first and second sets of servers;
wherein a received data stream comprising a plurality of tuples having respective key values is separated into portions that are delivered to respective ones of the servers of the first set to permit different tuples having the same key value to be processed by different servers of the first set;
wherein for each distinct key value, in each of at least a subset of the servers of the first set a corresponding partial key result is maintained based on one or more of the tuples having that key value that are received by that server such that a first one of the servers of the first set maintains a first partial key result for a first key value and at least a second one of the servers of the first set maintains a second partial key result for the first key value;
wherein the partial key results are periodically delivered from the servers of the first set to the servers of the second set to ensure that different partial key results having the same key value are processed by the same server of the second set;
wherein a given partial key result for a particular key value maintained in a given one of the servers of the first set is based at least in part on a number of tuples having the particular key value that are received by the given server; and
wherein a rate of delivery of the partial key results from the servers of the first set to the servers of the second set varies as a function of (i) a rate at which tuples having a given one of the key values are processed by at least a given one of the servers of the second set and (ii) an arrival rate of tuples having the given key value.

19. The apparatus of claim 18 wherein said at least one processing device comprises a plurality of processing devices implementing respective ones of at least a subset of the first and second sets of servers.

20. The apparatus of claim 18 wherein the given server comprises:
at least one aggregation function configured to generate partial key results for received tuples having respective key values; and
at least one scheduler configured to select particular ones of the partial key results for delivery to corresponding ones of the servers of the second set.

21. The apparatus of claim 20 wherein said at least one scheduler further comprises a plurality of schedulers each configured to select particular ones of the partial key results for delivery to a particular one of the servers of the second set.

22. A data processing system comprising the apparatus of claim 18.

23. A tangible and non-transitory processor-readable storage medium having embodied therein executable program code that when executed causes at least one processing device:
- to receive a data stream comprising a plurality of tuples having respective key values;
- to separate the data stream into portions that are delivered to respective ones of a first set of servers permitting different tuples having the same key value to be processed by different servers of the first set;
- for each distinct key value, to maintain in each of at least a subset of the servers of the first set a corresponding partial key result based on one or more of the tuples having that key value that are received by that server such that a first one of the servers of the first set maintains a first partial key result for a first key value and at least a second one of the servers of the first set maintains a second partial key result for the first key value; and
- to periodically deliver the partial key results from the servers of the first set to servers of a second set of servers ensuring that different partial key results having the same key value are processed by the same server of the second set;
- wherein a given partial key result for a particular key value maintained in a given one of the servers of the first set is based at least in part on a number of tuples having the particular key value that are received by the given server; and
- wherein a rate of delivery of the partial key results from the servers of the first set to the servers of the second set varies as a function of (i) a rate at which tuples having a given one of the key values are processed by at least a given one of the servers of the second set and (ii) an arrival rate of tuples having the given key value.

24. The processor-readable storage medium of claim 23 wherein the processor-readable storage medium comprises at least one of an electronic memory and a storage disk.

* * * * *